(12) United States Patent
El-Helw et al.

(10) Patent No.: US 9,501,536 B1
(45) Date of Patent: Nov. 22, 2016

(54) QUERY PLAN GENERATION FOR QUERIES HAVING COMMON EXPRESSIONS

(71) Applicant: Pivotal Software, Inc., Palo Alto, CA (US)

(72) Inventors: Amr El-Helw, San Mateo, CA (US); Venkatesh Raghavan, Sunnyvale, CA (US); Mohamed F. Soliman, San Mateo, CA (US); George Constantin Caragea, San Mateo, CA (US); Michail Petropoulos, San Francisco, CA (US)

(73) Assignee: Pivotal Software, Inc., Palo Alto, CA (US)

( * ) Notice: Subject to any disclaimer, the term of this patent is extended or adjusted under 35 U.S.C. 154(b) by 256 days.

(21) Appl. No.: 14/336,981

(22) Filed: Jul. 21, 2014

(51) Int. Cl.
    *G06F 17/30* (2006.01)
(52) U.S. Cl.
    CPC .............................. *G06F 17/30545* (2013.01)
(58) Field of Classification Search
    CPC ................ G06F 17/30401; G06F 17/30424; G06F 17/30433; G06F 17/30451; G06F 17/30454
    See application file for complete search history.

(56) References Cited

U.S. PATENT DOCUMENTS

| | | | |
|---|---|---|---|
| 6,915,290 B2 * | 7/2005 | Bestgen | G06F 17/30436 |
| 7,333,981 B2 * | 2/2008 | Dettinger | G06F 17/30436 |
| 8,204,903 B2 * | 6/2012 | Bowers | G06F 17/30401 707/713 |

OTHER PUBLICATIONS

Ahmed, et al. "Cost-Based Query Transformation in Oracle," VLDB, Sep. 2006, 1026-1036.
Antova, et al. "Optimizing Queries over Partitioned Tables in MPP Systems," SIGMOD, Jun. 2014, 12 pages.
Bear, et al, "The Vertica Database: SQL RDBMS for Managing Big Data," MBDS, Sep. 2012, 37-38.
Bellamkonda, et al. "Enhanced subquery optimizations in oracle," PVLDB, vol. 2, No. 2, Aug. 2009, 12 pages.
Chang, et al. "HAWQ: A Massively Parallel Processing SQL Engine in Hadoop," in SIGMOD, Jun. 2014, 1223-1234.
Graefe, "The Cascades Framework for Query Optimization," IEEE Data Eng. Bull., vol. 18, No. 3, 1995, 19-28.
Pivotal, "HD: HAWQ," Apr. 2013, Retrieved on Oct. 22, 2014, http://www.pivotal.io/sites/default/files/Hawq_WP_042313_FINAL.pdf, 4 pages.
Shankar, et al. "Query Optimization in Microsoft SQL Server PDW," "SIGMOD", May 2012, 767-775.
Soliman, et al. "Orca: A Modular Query Optimizer Architecture for Big Data," in SIGMOD, Jun. 2014, 11 pages.
TPC, "TPC-DS Benchmark," Apr. 2012, Retrieved on Oct. 22, 2014, http://www.tpc.org/tpcds, 161 pages.

* cited by examiner

*Primary Examiner* — Cheryl Lewis
(74) *Attorney, Agent, or Firm* — Fish & Richardson P.C.

(57) ABSTRACT

Methods, systems, and apparatus, including computer programs encoded on computer storage media, for generating query plans for queries that include common expressions. One of the methods includes receiving an initial query plan generated for a query that includes multiple common expressions; identifying two or more matching subtrees of the initial query plan; generating an alternative query plan that includes a CTE producer operator and having an instance of one of the matching subtrees as one or more descendant operators of the CTE producer operator, including replacing at least one instance of a matching subtree in the initial query plan with a CTE consumer operator corresponding to the CTE producer operator; computing respective costs for the initial query plan and the alternative query plan; selecting the alternative query plan based on the cost for the alternative query plan; and computing a result for the query using the alternative query plan instead of the initial query plan.

21 Claims, 16 Drawing Sheets

QUERY PLAN GENERATION FOR QUERIES HAVING COMMON EXPRESSIONS

BACKGROUND

This specification relates to query planning for distributed databases.

Massive distributed databases include tables that are partitioned across multiple storage devices, in which each partition stores a subset of the rows or columns of a particular table.

Some database systems can compute a result for queries that include common table expressions (CTEs). A CTE is an expression in a query that has a name and one or more associated definitional statements. A database system can compute a result for the one or more associated statements and materialize the result in memory or in an underlying storage subsystem. When the query references the name of the CTE, a database system can read the materialized result from memory or storage rather than recomputing the result for the statements associated with the CTE.

SUMMARY

This specification describes how a system can eliminate system deadlocks when computing a result for a query that includes a common table expression (CTE), how a system can improve system performance by inlining instances of CTE consumers when generating candidate query plans, and how a system can generate CTE producer and consumer operators to eliminate common expressions in queries.

In general, one innovative aspect of the subject matter described in this specification can be embodied in methods that include the actions of receiving a query that includes a first common table expression (CTE), wherein the first CTE is an expression in the query having a name and one or more associated definitional statements, wherein the first CTE signifies that a system can compute a result for the query using a query plan that includes a CTE producer operator and a corresponding CTE consumer operator, the CTE producer operator having descendant operators that compute a result of the one or more definitional statements and materialize the result, and wherein the corresponding CTE consumer operator reads the materialized result; identifying a scope of the name of the CTE within the query, the scope being a particular portion of the query from which the name of the CTE can validly be referenced; generating a query plan that includes a sequence operator having two child operators, wherein the sequence operator computes a result for each of its child operators in order and returns a result computed by a second child operator of the sequence operator, wherein a first child operator of the sequence operator includes the CTE producer operator of the CTE, and wherein a second child operator of the sequence operator includes a subtree of the query plan corresponding to the scope of the CTE within the query; and computing a result for the query using the query plan. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. Generating the query plan comprises determining that the query includes a later-defined second CTE defined after the CTE in the query; and in response to determining that the query includes a later-defined second CTE within the one or more definitional statements of the first CTE, generating the query plan to include a second sequence operator having two child operators, wherein a first child operator of the second sequence operator includes a second CTE producer operator of the second CTE, and wherein a second child operator of the second sequence operator includes a second subtree of the query plan corresponding to the scope of the second CTE within the query, and wherein the second sequence operator is a descendant of the second child operator of the first sequence operator. The later-defined second CTE is a nested CTE defined within the one or more definitional statements of the first CTE. The later-defined second CTE is defined within a same WITH clause as the first CTE. A definitional statement of the second CTE references the first CTE in the query, and wherein the second CTE producer operator has as a descendant the CTE consumer operator of the first CTE. The actions include generating an alternative version of the query plan, the alternative version of the query plan having a copy of one or more descendants of the CTE producer operator in place of an instance of the CTE consumer operator; and computing a first cost for an initial version of the query plan and a second cost for the alternative version of the query plan; determining that the second cost is less than the first cost; and wherein computing a result for the query using the query plan comprises computing a result for the query using the alternative version of the query plan instead of the initial version of the query plan. The alternative query plan comprises a second instance of the CTE consumer operator. The first cost for the initial version of the query plan includes a cost associated with materializing the result of the CTE producer operator and a cost associated with the CTE consumer operator reading the materialized result from a storage subsystem. The first cost for the initial version of the query plan includes a cost associated with transferring data between computing nodes in the system. The second cost for the alternative version of the query plan includes a cost of recomputing a result for the CTE producer operator and its descendant operators. Computing a second cost for the alternative version of the query plan comprises reusing a computed cost of descendants of the CTE producer operator for an inlined instance of a CTE consumer operator. The actions include determining that the CTE is referenced exactly once in the query; and in response to determining that the CTE is referenced exactly once in the query, generating an alternative version of the query plan, the alternative version of the query plan having a copy of one or more descendants of the CTE producer operator in place of the CTE consumer operator, wherein computing a result for the query using the query plan comprises computing a result for the query using the alternative version of the query plan instead of an initial version of the query plan.

In general, another innovative aspect of the subject matter described in this specification can be embodied in methods that include the actions of receiving a query that includes a common table expression (CTE), wherein the CTE is an expression in the query having a name and one or more associated definitional statements, wherein the CTE signifies that a system can compute a result for the query using a query plan that includes a CTE producer operator and a corresponding CTE consumer operator, the CTE producer operator having descendant operators that compute a result of the one or more definitional statements and materializes the result, and wherein the corresponding CTE consumer operator reads the materialized result; generating a first query plan that includes a CTE producer operator and a corresponding CTE consumer operator; generating a second query plan that inlines an instance of the CTE consumer operator; computing a first cost for the first query plan and a second cost for the second query plan; determining that the second cost is less than the first cost; and computing a result for the query using the second query plan instead of the first query plan. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. The first cost for the first query plan includes a cost associated with materializing the result of the CTE producer operator and a cost associated with the CTE consumer operator reading the materialized result from a storage subsystem. The first cost for the first query plan includes a cost associated with transferring data between computing nodes in the system. The second cost for the second query plan includes a cost of recomputing a result for the CTE producer operator and its descendant operators. Computing the second cost for the second query plan comprises reusing a computed cost of descendants of the CTE producer operator for an inlined instance of a CTE consumer operator.

In general, another innovative aspect of the subject matter described in this specification can be embodied in methods that include the actions of receiving an initial query plan generated for a query that includes multiple common expressions; identifying two or more matching subtrees of the initial query plan; generating an alternative query plan that includes a CTE producer operator and having an instance of one of the matching subtrees as one or more descendant operators of the CTE producer operator, including replacing at least one instance of a matching subtree in the initial query plan with a CTE consumer operator corresponding to the CTE producer operator; computing respective costs for the initial query plan and the alternative query plan; selecting the alternative query plan based on the cost for the alternative query plan; and computing a result for the query using the alternative query plan instead of the initial query plan. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. Each matching subtree includes a leaf-level operator of the initial query plan. Identifying one or more matching subtrees of the initial query plan comprises identifying matching subtrees of increasing depth until no subtrees in the initial query plan match. Generating the alternative query plan comprises inlining an instance of the CTE consumer operator. The cost for the alternative query plan includes a cost associated with materializing the result of the CTE producer operator and a cost associated with the CTE consumer operator reading the materialized result from a storage subsystem. The cost for the alternative query plan includes a cost associated with transferring data between computing nodes in the system. The cost for the initial query plan includes a cost of recomputing a result for each of the multiple common expressions.

Particular embodiments of the subject matter described in this specification can be implemented so as to realize one or more of the following advantages. System deadlocks when computing CTEs can be eliminated. The performance of computing a result for a query can be improved by dynamically determining whether to inline individual instances of CTE operators in a query plan. Particular instances of a CTE consumer operator in a query plan can be inlined or not inlined in a single query using a cost-based optimization framework. Repeated evaluation of common expressions in queries can be avoided by generating CTE producer and consumer operators, even when the query did not include a definition of a CTE.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Table 1 includes an example of a query that includes a common table expression (CTE).

TABLE 1

| |
|---|
| WITH v AS (SELECT a from T where b=10) |
| SELECT * FROM v as v1, v as v2 |
| WHERE v1.a < v2.a |

CTEs are generally defined by a WITH clause that immediately precedes a corresponding SELECT statement. The WITH clause includes a name of the CTE and one or more definitional statements of the CTE. A user can reference a defined CTE within the query instead of repeating the definitional statements multiple times within the query. A system can also use the CTE to avoid recomputing a result for the definitional statements.

In Table 1, a CTE with the name v is defined by the WITH clause, which has an associated definitional statement "SELECT a from T where b=10". The name of the CTE, v, is then referenced within the corresponding SELECT statement, "SELECT * FROM v as v1, v as v2 WHERE v1.a<v2.a".

By referencing the CTE, the query avoids repeating the definitional SELECT statement, and a system may be able to reuse the results computed for the definitional SELECT statement when computing a result for the query.

Figure 1:
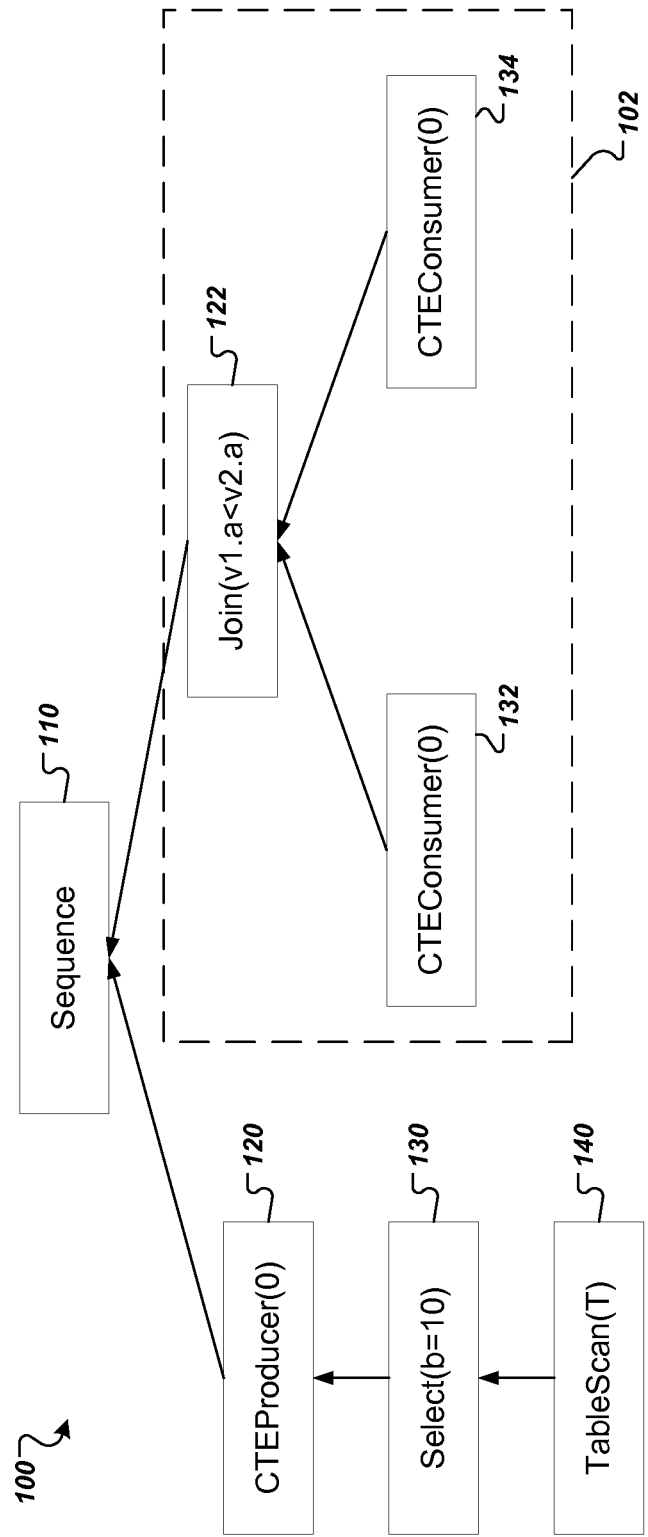
FIG. 1 illustrates an example query plan for computing a result for the query of Table 1.

FIG. 1 illustrates an example query plan 100 for computing a result for the query of Table 1. A query plan generally specifies operations to be performed to compute a result for a query. The query plan uses operators to specify the order of the operations and the data flow between operators carrying out the operations.

An operator represents one or more operations to be performed in order to compute a result for the query. Thus, if an operator is described as performing an action or providing data to another operator, the action will be performed by a computing node executing the operations of the operator or providing data to another computing node executing the operations of the other operator.

The operators are independent of the implementation details of any particular computing system or data storage subsystem. Thus, the operators represent operations that can be performed by any appropriate system.

Furthermore, the operators need not represent the allocation of actions among physical computing nodes. In other words, the operations of two operators can be performed by the same physical computing node or even within the same process on a single computing node.

A query plan can be represented as a tree, with the tree nodes representing operators and edges between the tree nodes representing data being communicated between operators, which may include transferring data between computing nodes that are executing the operators. In some implementations, the query plan is represented as a tree. Computation generally proceeds bottom-up at the leaf operators of the tree, with each operator outputting its computation results to its parent operator. The operator at the root node of the query plan thus computes the final result for the query or a portion of the query represented by the query plan.

In FIG. 1, the query plan 100 represents an arrangement of operators that defines a sequence of operations for computing a result for the query in Table 1. The query plan 100 includes a CTE producer operator 120 and two CTE consumer operators 132 and 134 for the CTE in the query.

The descendant nodes of a CTE producer operator in a query plan compute a result for the definitional statements of a CTE. The CTE producer operator receives the computed result and materializes the result in an underlying storage subsystem for access by one or more CTE consumer operators. This allows the CTE consumer operators to reuse the results of the computation and saves the consumer operators from having to recompute the result computed by the CTE producer operator.

The query plan 100 in FIG. 1 includes a CTE producer operator 120 for the CTE v. The child operators 130 and 140 of the CTE producer operator 120 compute a result for the definitional statements of the CTE, "SELECT a from T where b=10."

The CTE producer operator 120 has an identifier, "0", for matching the computed result to corresponding CTE consumer operators of the same CTE, e.g., the CTE consumer operators 132 and 134 having the matching identifier. In this example, the identifier is an integer. The system can use any appropriate identifier, including the name of the CTE, v, within the query.

To compute a result for the definitional statements of the CTE, the query plan starts with a table scan operator 140 that reads values of tuples of the table T and passes them to the select operator 130. The select operator 130 outputs values of the attribute a from tuples in the table T having a value for the attribute b that satisfies the predicate expression "b=10". The CTE producer operator 120 receives the values satisfying the predicate expression and stores the values in an underlying storage system for access by the CTE consumer operators 132 and 134 of the CTE. The CTE producer operator 120 then outputs to the sequence operator 110 an indication that its operations have completed.

A sequence operator, e.g., the sequence operator 110, enforces a time ordering of its child operators. In other words, the sequence operator 110 waits for its first child to provide an indication that its operations are complete before signaling the beginning of execution for its next child operator. Therefore, the join operator 122 and the CTE consumer operators 132 and 134 will not begin execution until the CTE producer operator 120 has completed execution.

When the last child operator of a sequence operator has completed, the sequence operator returns the result of the last child operator. Therefore, the sequence operator 110 will return the result provided by the join operator 122.

By using a sequence operator 110 in the query plan, a system can prevent deadlocks arising from computing CTEs by ensuring that the result of a CTE producer operator has been materialized before corresponding CTE consumer operators attempt to read the materialized result. The CTE consumer operators 132 and 134 thus read the result materialized by the CTE producer operator 120.

Figure 2:
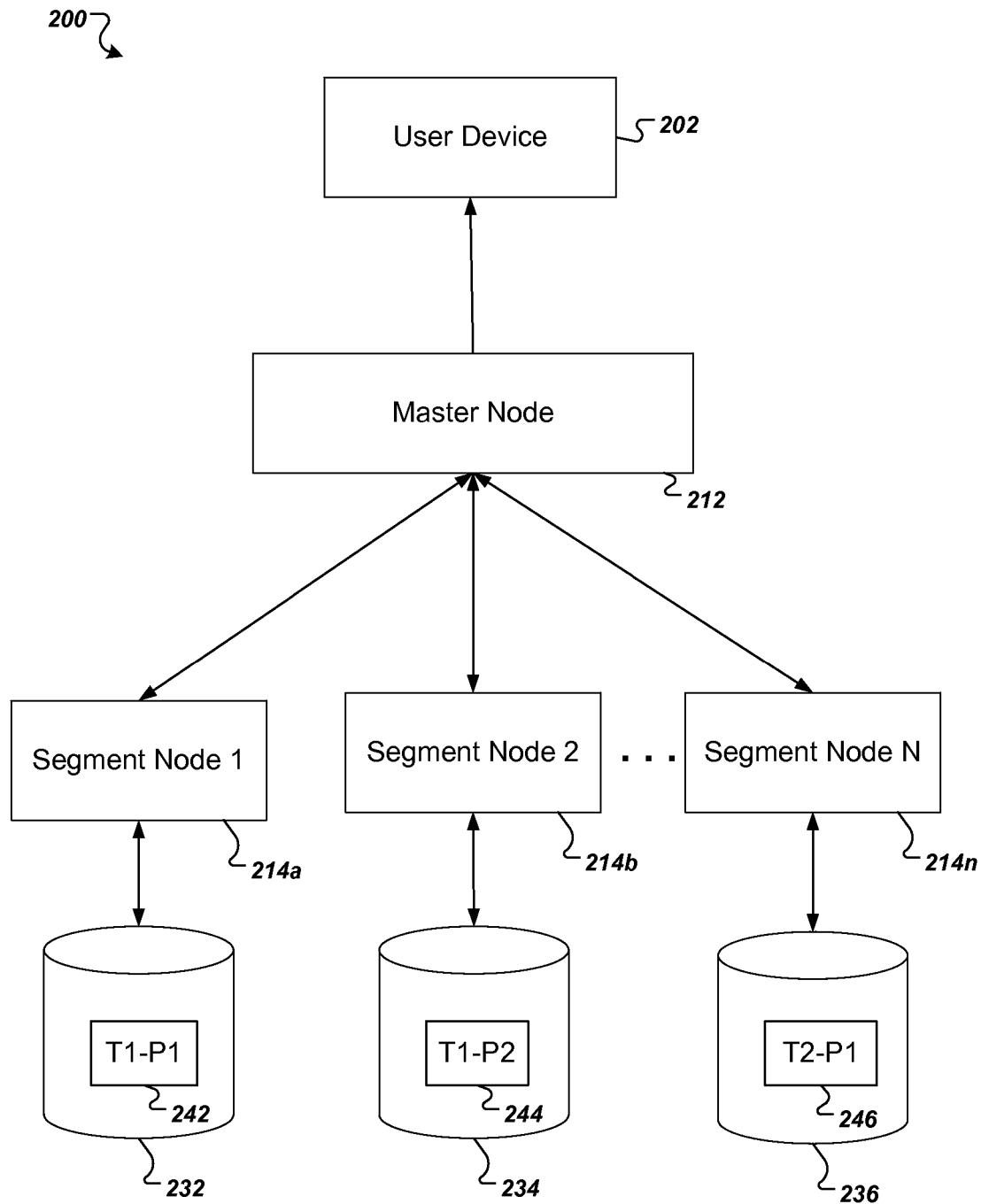
FIG. 2 is a diagram of an example system.

FIG. 2 is a diagram of an example system 200. The system 200 is an example of a computing system that can implement CTEs to compute results for queries.

The distributed system 200 includes a master node 212 and multiple segment nodes 214a, 214b, through 214n. The master node 212 and each segment node 214a-n are implemented as one or more physical computers or as software installed as a virtual machine on a physical computer. The master node 212 and the segment nodes 214a-n are connected by one or more communications networks, e.g., a local area network or a wide area network, e.g., the Internet. The master node 212 assigns each segment node to operate on a portion of data stored in the distributed system 200.

For example, the master node 212 has assigned a first segment node 214a to operate on a first partition 242 of a first database table stored in a first storage subsystem 232. Similarly, the master node 212 has assigned a second segment node 214b to operate on a second partition 244 for the first database table, stored in a second storage subsystem 234, and the master node 212 has assigned a third segment node 214n to operate on a first partition 246 of a second database table stored in an third storage subsystem 236.

A user of a user device 202 can access data stored in the distributed system 200 by communicating with the master node 212. The master node 212 coordinates with the segment nodes 214a-214n to respond to requests for data from the user device 202. The user device 202 can issue a query, e.g., a query in structured query language (SQL) or object query language (OQL), to the master node 212.

The master node 212 communicates with the segment nodes 214a-214n to obtain data that satisfies the query. The master node 212 can divide the processing among N segment nodes, e.g., the segment nodes 214a-n. The segment nodes can access data in an underlying distributed storage system, for example, the Hadoop File System (HDFS).

When the master node 212 receives a query, the master node 212 parses the query and generates a query plan. The query plan defines the operations that the master node 212 will distribute to the segment nodes to fulfill the query. The master node 212 may access a system catalog and perform cost estimation and optimization algorithms to determine a query plan having a lowest cost, which may be measured in a variety of ways, e.g., in terms of processing time, intermediate storage capacity, disk reading time, disk writing time, network bandwidth required, or a combination of them, for computing a result for a query using each particular query plan. Functionality of the master node 212 may be implemented by multiple software modules performing different functions, for example, a query parser and a query planner.

In particular, the master node 212 can generate query plans that avoid system deadlocks because of CTEs in the query by using sequence operators. Avoiding deadlocks with sequence operators will be described in more detail below with reference to FIGS. 3-6. The master node 212 can also consider multiple candidate query plans, some of which inline some CTE consumer operators, when deciding on which query plan to distribute to the segment nodes 214a-n. Inlining CTEs will be described in more detail below with reference to FIGS. 7-8E. The master node 212 can also avoid repeated computation of common expressions in queries by generating candidate query plans that include CTE producer and consumer operators, which is described in more detail below with reference to FIGS. 10-11B.

Figure 3:
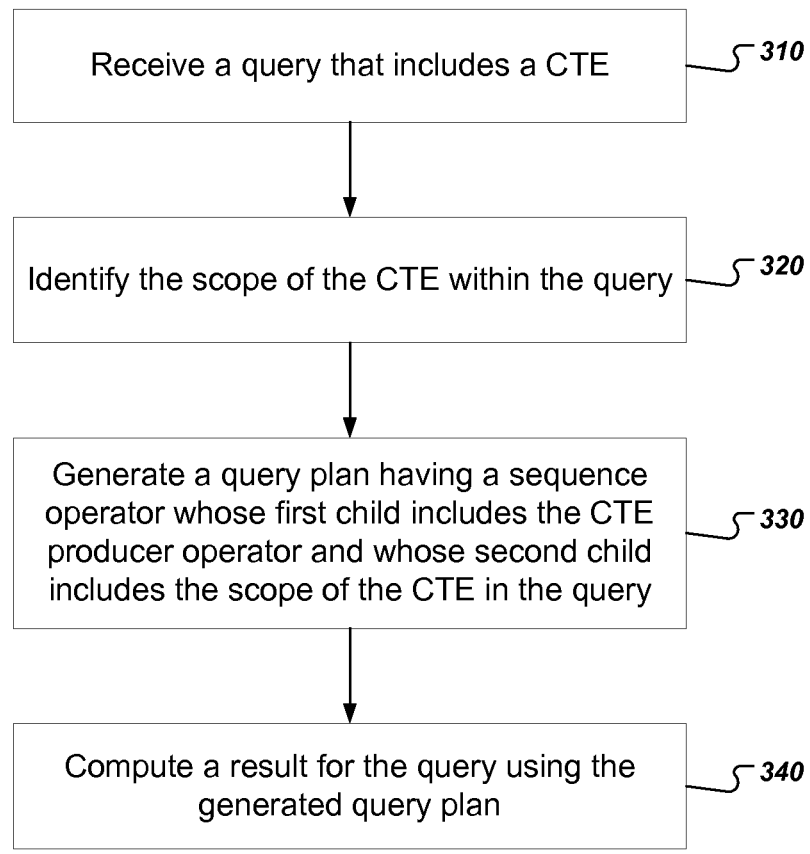
FIG. 3 is a flow chart of an example process for generating a query plan for a query that includes CTEs.

FIG. 3 is a flow chart of an example process for generating a query plan for a query that includes CTEs. In general, when a query includes CTEs, a system can use sequence operators to enforce an ordering between CTE producers and CTE consumers. The process can be implemented by one or more computer programs installed on one or more computers. The process will be described as being performed by a system of one or more computers, e.g., the master node 212 of FIG. 2.

The system receives a query that includes a CTE (310). The system can receive the query at a master node from a user device. The system can parse the query to determine whether the query is a valid query and can identify one or more CTEs in the query.

The system identifies the scope of the CTE within the query (320), and generates a query plan having a sequence operator whose first child includes a CTE producer operator and whose second child includes the scope of the CTE in the query (330).

When the system parses the query, the system will evaluate all variables in the query to determine their scope, including the scope of the CTE. The scope of the CTE is a portion of the query from which the name of the CTE can be referenced by other statements in the query.

In general, the scope of a CTE includes statements within the corresponding subsequent SELECT statement, as well as any later-defined CTEs within the same WITH clause.

For example, in the example query in Table 1, the scope of v includes the entirety of the corresponding SELECT statement.

In FIG. 1, the query plan for the query in Table 1, the first child operator of the sequence operator 110 is the CTE producer operator 120 for v.

The second child operator of the sequence operator 110 is a subtree 102 of the query plan that corresponds to the scope of the CTE, which includes a portion of the query plan corresponding to portions of the query that can validly reference the CTE.

In this example, the scope of the CTE includes the corresponding SELECT statement. Therefore, the subtree 102 of the second child operator represents operations for the corresponding SELECT statement in the query.

Table 2 includes a valid query that defines two CTEs within the same WITH clause.

TABLE 2

WITH v as (SELECT a from T where b=10),
   w as (SELECT v1.a from v as v1, v as v2 WHERE v1.a<v2.a)
SELECT * from v as v3, w as w1, w as w2
WHERE v3.a<w1.a + w2.a In the query in Table 2, the CTE v is defined before the CTE w within the same WITH clause. Generally, when multiple CTEs are defined within a single WITH clause, definitional statements within one CTE can only reference other CTEs that were earlier defined in the WITH clause. Thus, the definitional statements of w can validly reference v, but the definitional statements of v cannot validly reference w.

Therefore, the scope of v includes the definitional statements in the later-defined CTE w as well as the corresponding subsequent SELECT statement. However, the scope of w only includes the corresponding subsequent SELECT statement.

Figure 4:
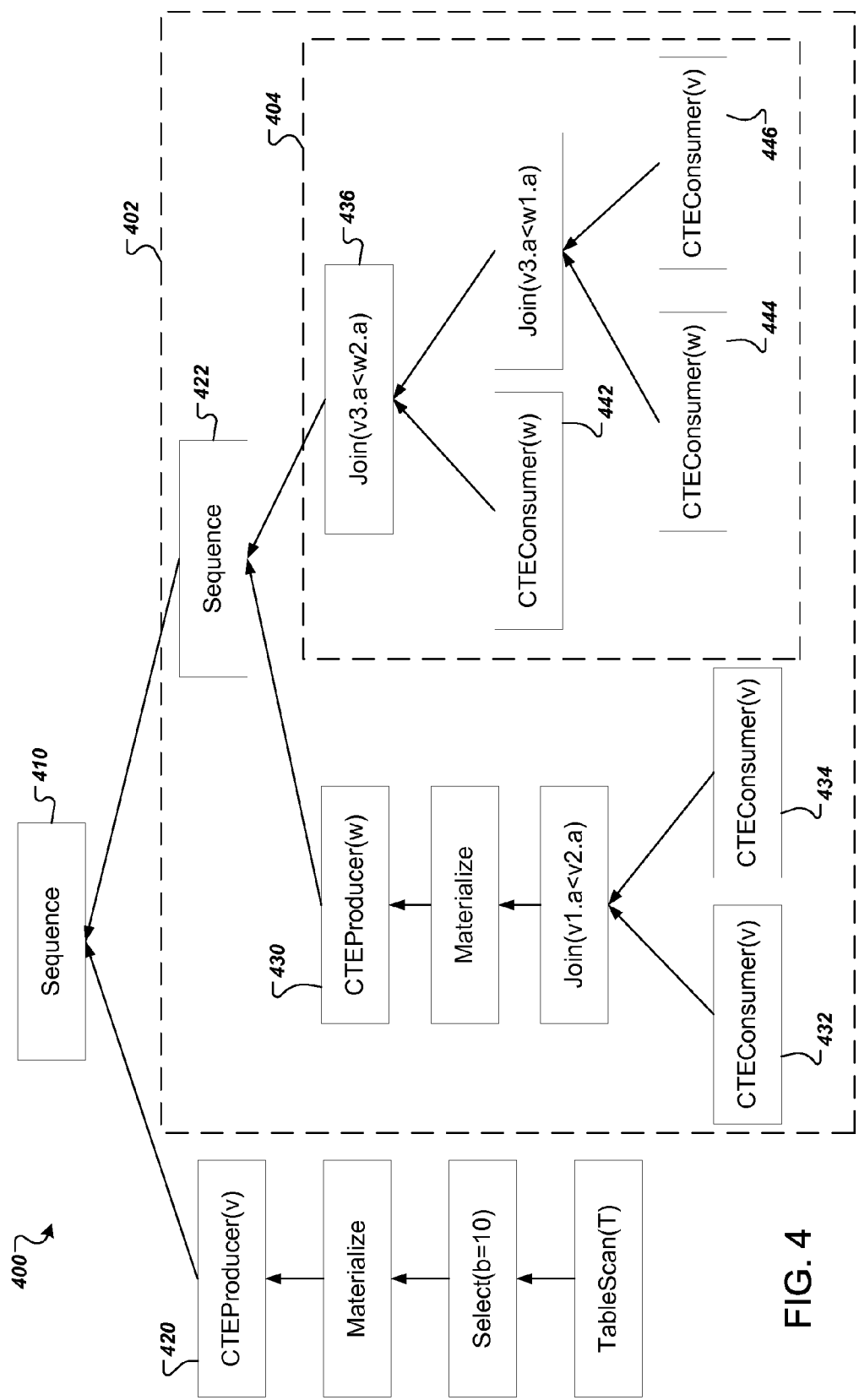
FIG. 4 illustrates an example query plan for the WITH clause of Table 2, which includes multiple CTE definitions.

FIG. 4 illustrates an example query plan 400 for the WITH clause of Table 2, which includes multiple CTE definitions. Because the definitional statements of w can reference v in the query, the query plan 400 ensures that v is defined first using the first sequence operator 410.

The first child operator of the sequence operator 410 is the CTE producer operator 420 for v. The CTE producer operator 420 and its descendants compute the result for v and materialize the result for use by CTE consumer operators of v.

The second child operator of the first sequence operator 410 is a subtree 402 of the query plan 400 that corresponds to the scope of v—statements in the query that can reference v. The scope of v includes the definitional statements of w and the corresponding subsequent SELECT statement.

The query plan 400 uses a second sequence operator 422 for defining the CTE w. The first child operator of the second sequence operator 422 is the CTE producer operator 430 for w. The CTE producer operator 430 and its descendants compute the result for w, including using two CTE consumer operators 432 and 434 of v, and materialize the result.

Because the first sequence operator 410 guarantees that the result for v is computed and materialized before being referenced by definitional statements of w, the CTE consumer operators 432 and 434 will not introduce any system deadlocks.

The second child operator of the second sequence operator 422 is a subtree 404 of the query plan 402 that corresponds to the scope of w. The scope of w includes the corresponding SELECT statement, which is computed using the join operator 436 The join operator 436 and its descendants use the CTE consumer operators for w 442 and 444 and the CTE consumer operator for v 446 to compute a result for the query.

Table 3 includes a valid query that defines nested CTEs.

TABLE 3

```
WITH v as (
    WITH w as (SELECT a from T where b=10)
    SELECT a FROM w WHERE a>5 )
SELECT * FROM v
```

In the query in Table 3, the CTE w is a nested CTE because w is defined inside the definitional statements of v. In general, the nesting of CTEs within definitional statements of other CTEs can be carried out within a query to an arbitrary number of levels.

The scope of v is only its corresponding SELECT statement, "SELECT * FROM v". Thus, v cannot validly be referenced inside the definitional statements of w, "SELECT a from T where b=10".

The scope of w also includes only its corresponding SELECT statement, "SELECT a FROM w WHERE a>5". Because the definition and scope of w occur within the definitional statements of v, w must be defined and referenced under the CTE producer of v in the resulting query plan.

Figure 5:
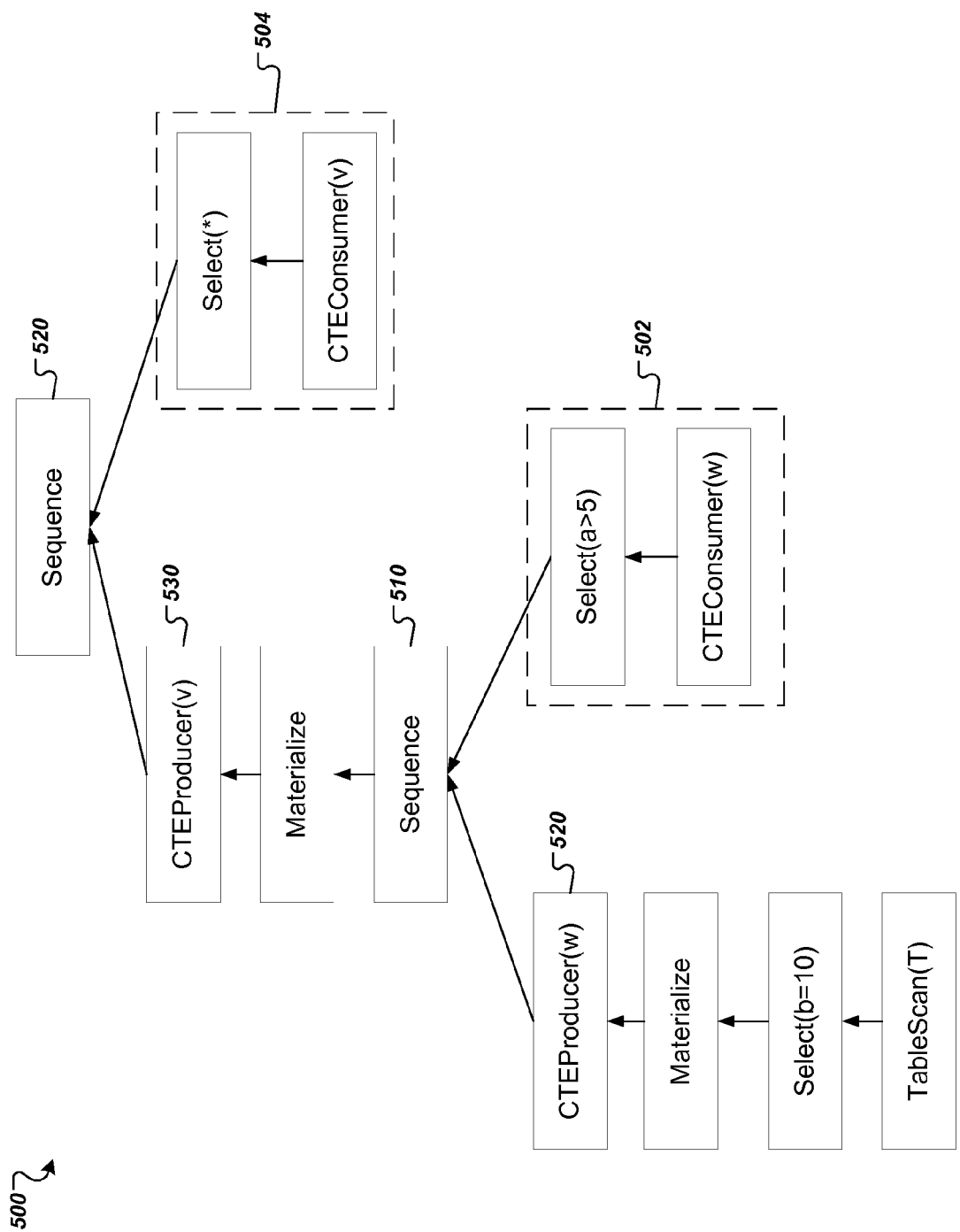
FIG. 5 illustrates an example query plan for the nested CTEs of Table 3.

FIG. 5 illustrates an example query plan 500 for the nested CTEs of Table 3. Because the definition of w is nested inside the definition of v, the system can generate a query plan 500 that uses a first sequence operator 510 to include both the scope and definition of w within the definition of v.

Thus, the first child operator of the first sequence operator 510 is the CTE producer operator 520 for w. The CTE producer operator 520 and its descendant operators compute and materialize the result for W.

The second child operator of the first sequence operator 510 is a subtree 502 of the query plan 500 that corresponds to the scope of w. The scope of w is only its corresponding SELECT statement.

The first sequence operator 510 orders the operators so that the operations of the definitional statements of w are computed before the operations of the scope of w. The sequence operator 510 then receives and passes on the result computed by its last child operator, the result from the subtree 502 of the query plan.

The second sequence operator 520 ensures that v is defined before it is referenced. Thus, the first child operator of the second sequence operator 520 includes the CTE producer operator 530 for v. The CTE producer operator 530 and its descendant operators receive the result from the second child operator of the first sequence operator 510 and materialize the result as the definition for v.

The second child operator of the second sequence operator 520 is a subtree 504 of the query plan 500 that corresponds to the scope of v. In this example, the scope of v is only the statements in its corresponding SELECT statement.

Table 4 includes a valid query that defines a CTE within a subquery.

TABLE 4

```
SELECT * from T
WHERE a IN (
    WITH v as (SELECT a from T where b=10)
    SELECT v1.a from v v1, v v2
    WHERE v1.a < v2.a)
```

The query in Table 4 includes a subquery defined by the IN clause. The scope of v includes the statements of its corresponding SELECT statement, which is within the subquery. However, the scope of v does not include any portion of the query outside of the subquery defined by the IN clause.

Figure 6:
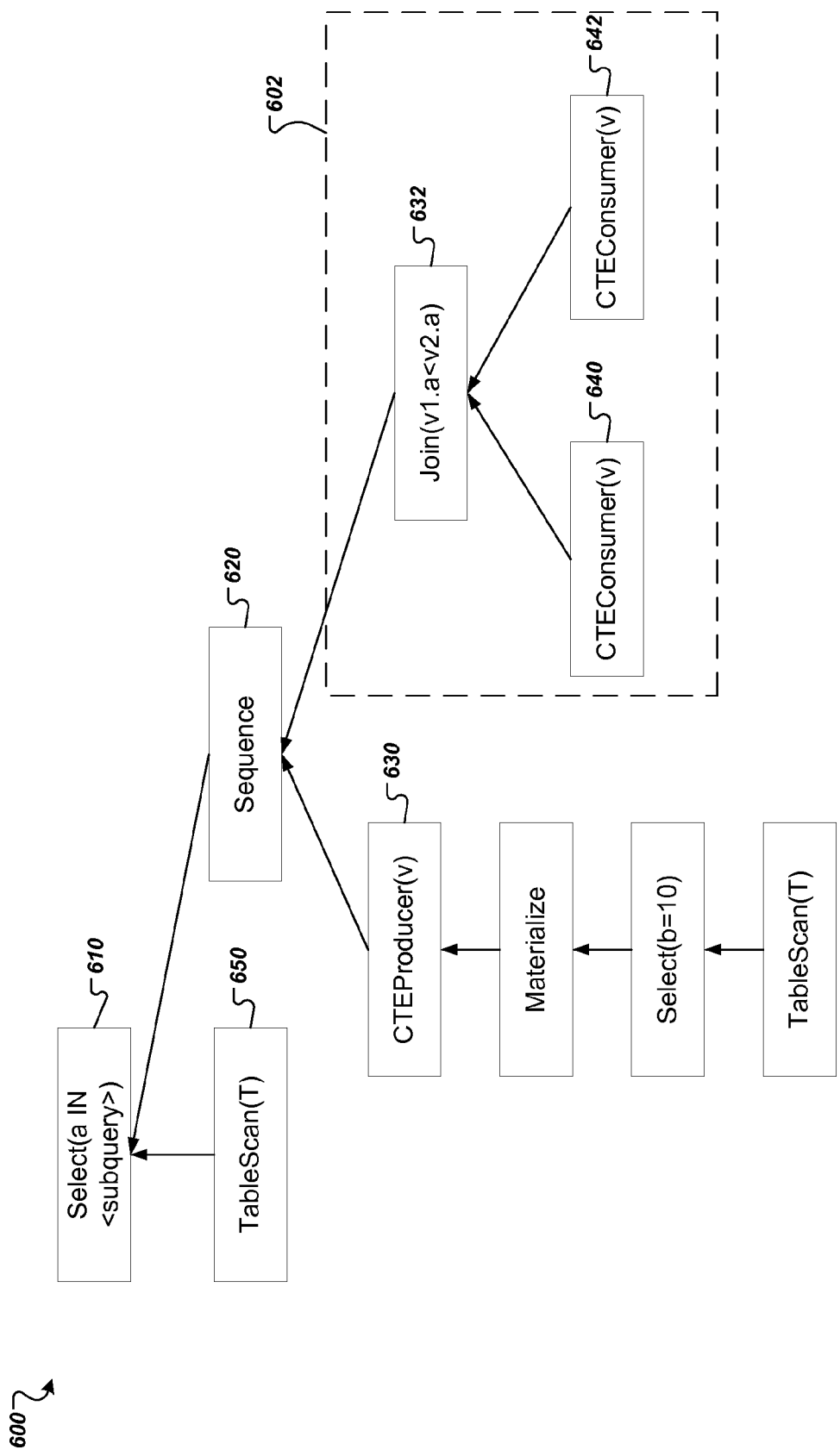
FIG. 6 illustrates an example query plan for the CTE defined within the subquery of Table 4.

FIG. 6 illustrates an example query plan 600 for the CTE defined within the subquery of Table 4. Because v cannot validly be referenced outside of the subquery, the sequence operator 620 for v is a child operator of a select operator 610 corresponding to the initial SELECT statement of the query. Some operators corresponding to statements outside of the subquery, e.g., the table scan operator 650, may thus execute before v is defined by the query plan. However, since v can only be referenced from within the subquery, the query plan 600 does not introduce any system deadlocks.

The first child operator of the sequence operator 620 includes the CTE producer operator 630 for v. The CTE producer operator 630 and its descendant operators compute and materialize the result for v.

The second child operator of the sequence operator 620 is a subtree 602 of the query plan 600 that corresponds to the scope of v, which includes the corresponding SELECT statement within the subquery, computed by the join operator 632. The join operator 632 acts on the output of two CTE consumer operators of v 640 and 642.

Figure 7:
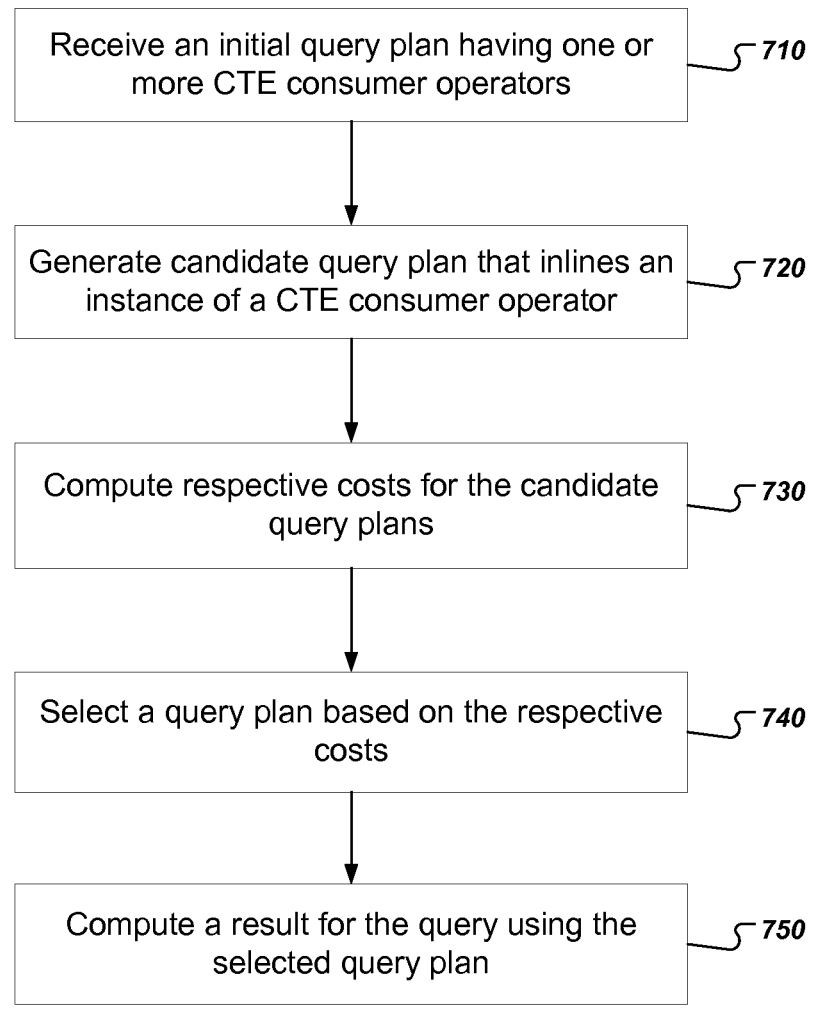
FIG. 7 is a flow chart of an example process for inlining CTEs.

FIG. 7 is a flow chart of an example process for inlining CTEs. In general, inlining a CTE includes replacing an instance of a CTE consumer operator in a query plan with a copy of the corresponding producer operators that produce a result to be materialized. Inlining CTEs can be more efficient when the definitional statement of that CTE is simple and the cost of materializing the result is high. The system can thus consider whether inlining some of the CTE consumer operators can reduce the cost of computing a result for the query, e.g., by reducing execution time, disk reads and writes required, or intermediate storage capacity required to compute the result of the CTE and materialize the result. The process can be implemented by one or more computer programs installed on one or more computers. The process will be described as being performed by a system of one or more computers, e.g., the master node 212 of FIG. 2.

The system generates an initial query plan having one or more CTE consumer operators (710).

Figure 8A:
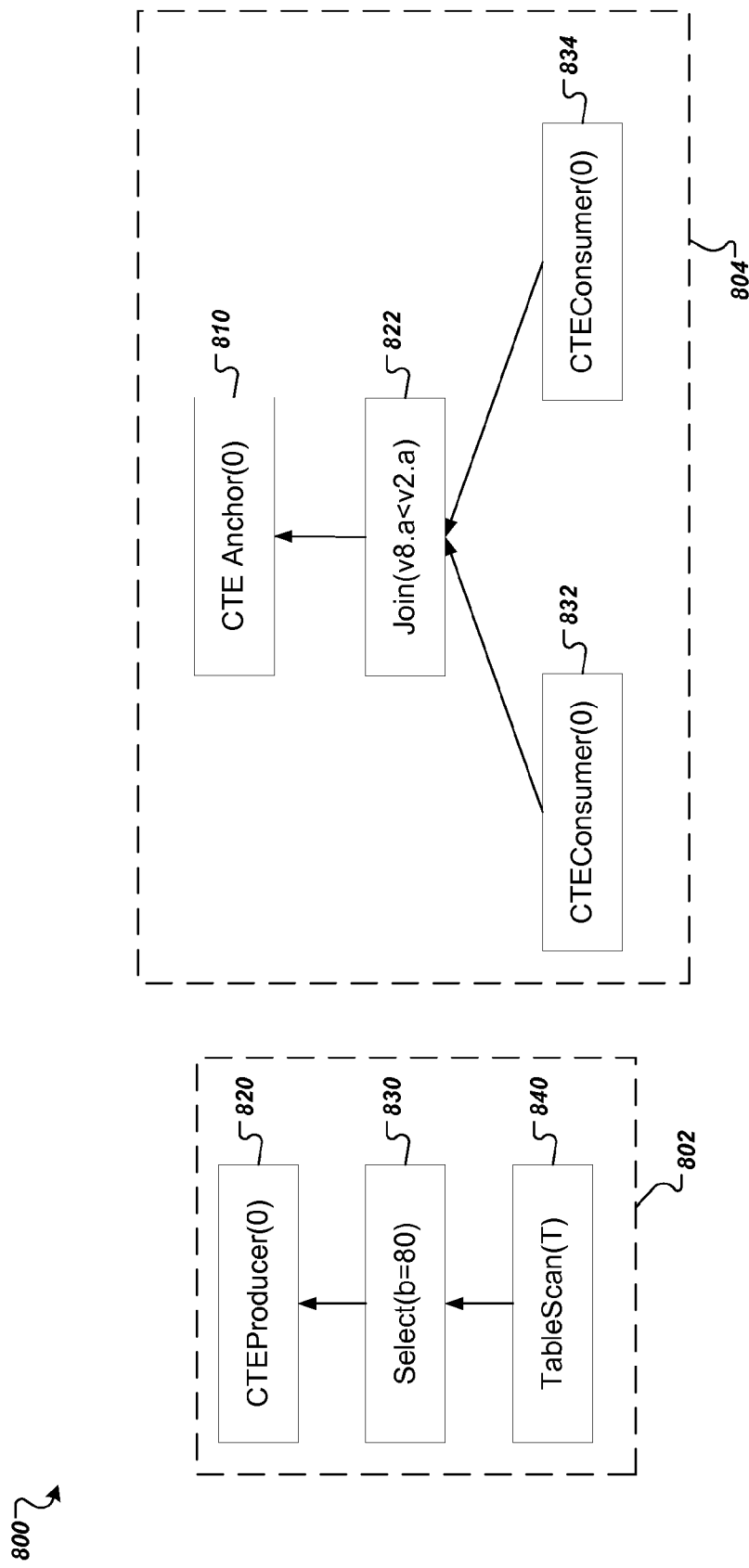
FIG. 8A illustrates an initial query plan for the CTE in the query of Table 1.

FIG. 8A illustrates an initial query plan 800 for the CTE in the query of Table 1. The initial query plan 800 includes a separate subtree 802 for the CTE producer operator 820 of the CTE, which is initially not connected to the subtree 804 for the rest of the query plan 800.

The initial query plan 800 includes a CTE anchor operator 810 that is used to mark the scope of the CTE in the query. In general, the CTE anchor operator 810 is used during query planning operations. The system can generate a final query plan that either excludes the CTE anchor operator 810, e.g., in the case that all CTEs are inlined, or replaces the CTE anchor operator 810 with a sequence operator, e.g., if at least some CTEs are not inlined.

As shown in FIG. 7, the system generates a candidate query plan that inlines an instance of a CTE consumer operator (720). In general, the system generates multiple candidate query plans that each compute a result for the query in different ways. The system will then select a candidate query plan that has a lowest cost according to a cost function that computes cost estimates for each query plan.

The system can inline an instance of a CTE consumer operator by generating a query plan in which the CTE consumer operator is replaced with a copy of one or more operators that would compute a result for the CTE producer operator. The inlined CTE consumer operator can generally omit materialize operators or operators for signaling that the CTE producer has completed execution. Thus, the system can inline a CTE consumer operator by replacing it in a query plan with a copy of all descendant operators of the corresponding CTE producer operator minus any top-most materialize operators used by a CTE producer operator for materializing the result of the CTE.

The system can generate additional candidate query plans using transformation rules on operators in the initial query plan. Each transformation rule generates a logically equivalent alternative for a particular operator or a physical implementation of a particular operator. For example, for a Join(A,B) operator, the system can use a transformation rule to generate the logically equivalent Join(B,A) operator, where only the join order has been reversed. As another example, the system can also generate an alternative Hash-Join(A,B) operator that indicates a physical data distribution for the Join(A,B) operator.

The system can compactly represent the space of possible query plan candidates as a number of groups of operators. Each non-leaf operator in a group has one or more other groups as children. The operators within a group represent logically equivalent alternatives for computing an intermediate result for the query. Each transformation rule may add new groups to the space of possible query plans or add new operators to existing groups.

The group structure allows the system to generate candidate query plans by operating on only a portion of the initial query plan. In addition, the system can spawn multiple processes in parallel to generate candidate query plans by applying transformation rules on operators in multiple groups of the initial query plan. Each of the multiple processes may additionally spawn other processes for generating alternatives for other portions of the query plan.

Figure 8B:
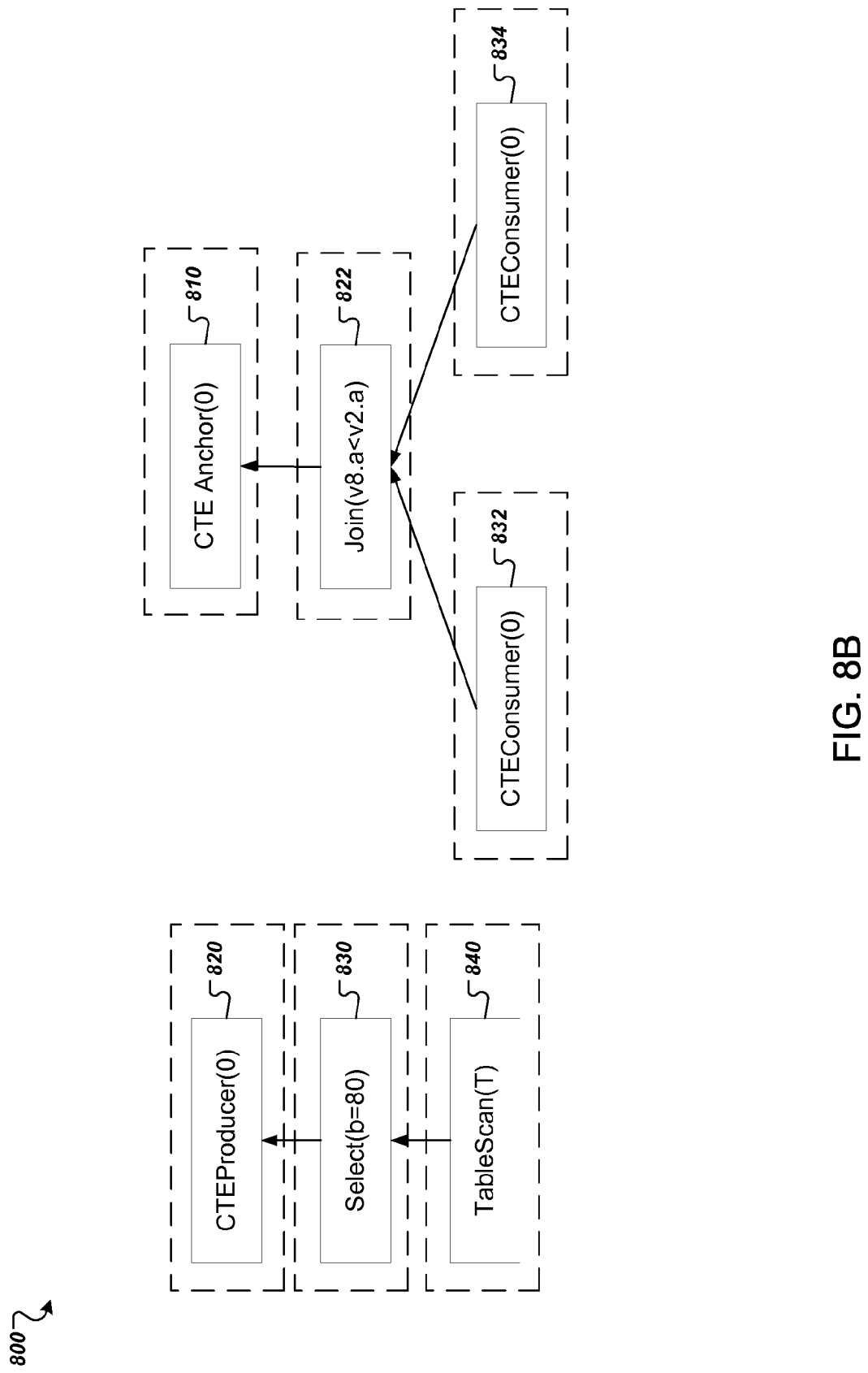
FIG. 8B illustrates groups of operators for the initial query plan.

FIG. 8B illustrates groups of operators for the initial query plan 800. Each dotted line represents a different group of operators. In this example, each operator of the initial query plan 800 is placed into a separate group.

Figure 8C:
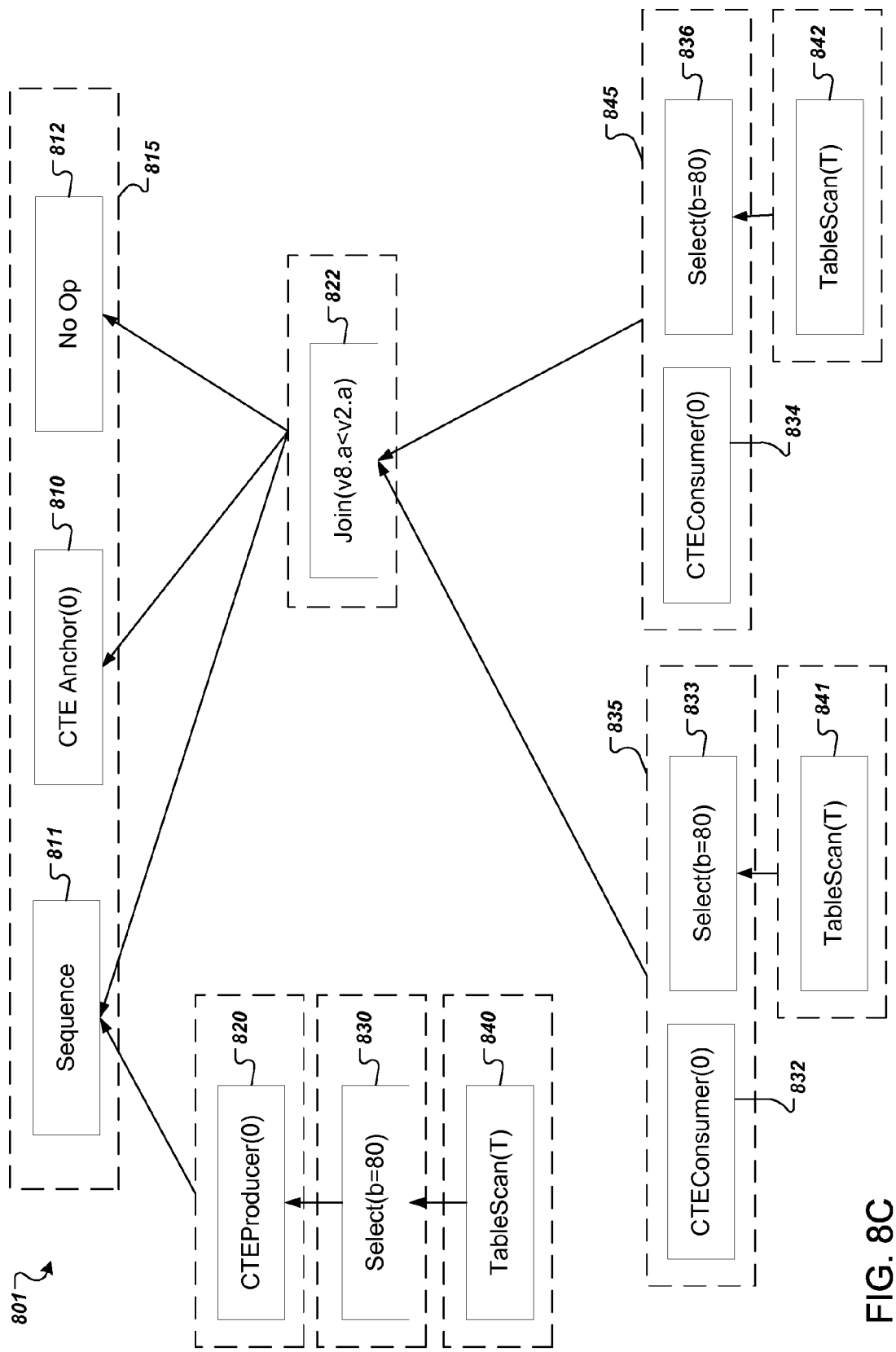
FIG. 8C illustrates groups of operators for the initial query plan after applying CTE related transformation rules.

FIG. 8C illustrates groups of operators for the initial query plan 800 after applying CTE-related transformation rules. The system can generate candidate query plans by expanding the groups of operators of the initial query plan 800 and selecting a particular operator from each group.

For example, the system can use a first transformation rule for the CTE anchor operator 810 to generate a sequence operator 811 and a no-op operator 812 for the group 815. The sequence operator 811 and the no-op operator 812 are alternatives to the CTE anchor operator 810 in the initial query plan 800.

Similarly, the system can use a second transformation rule to inline the CTE consumer operators 832 and 834 of the initial query plan 800. The system thus generates a select operator 833 for the group 835, which is a copy of the select operator 830 for the corresponding CTE producer operator 820. The system also copies the descendent subtree of the select operator 830. Thus, the system also adds the table scan operator 841, which is a copy of the table scan operator 840. Similarly, the system generates a select operator 836 for the group 845 as well as a descendant table scan operator 842, which is also a copy of the table scan operator 840.

Figure 8D:
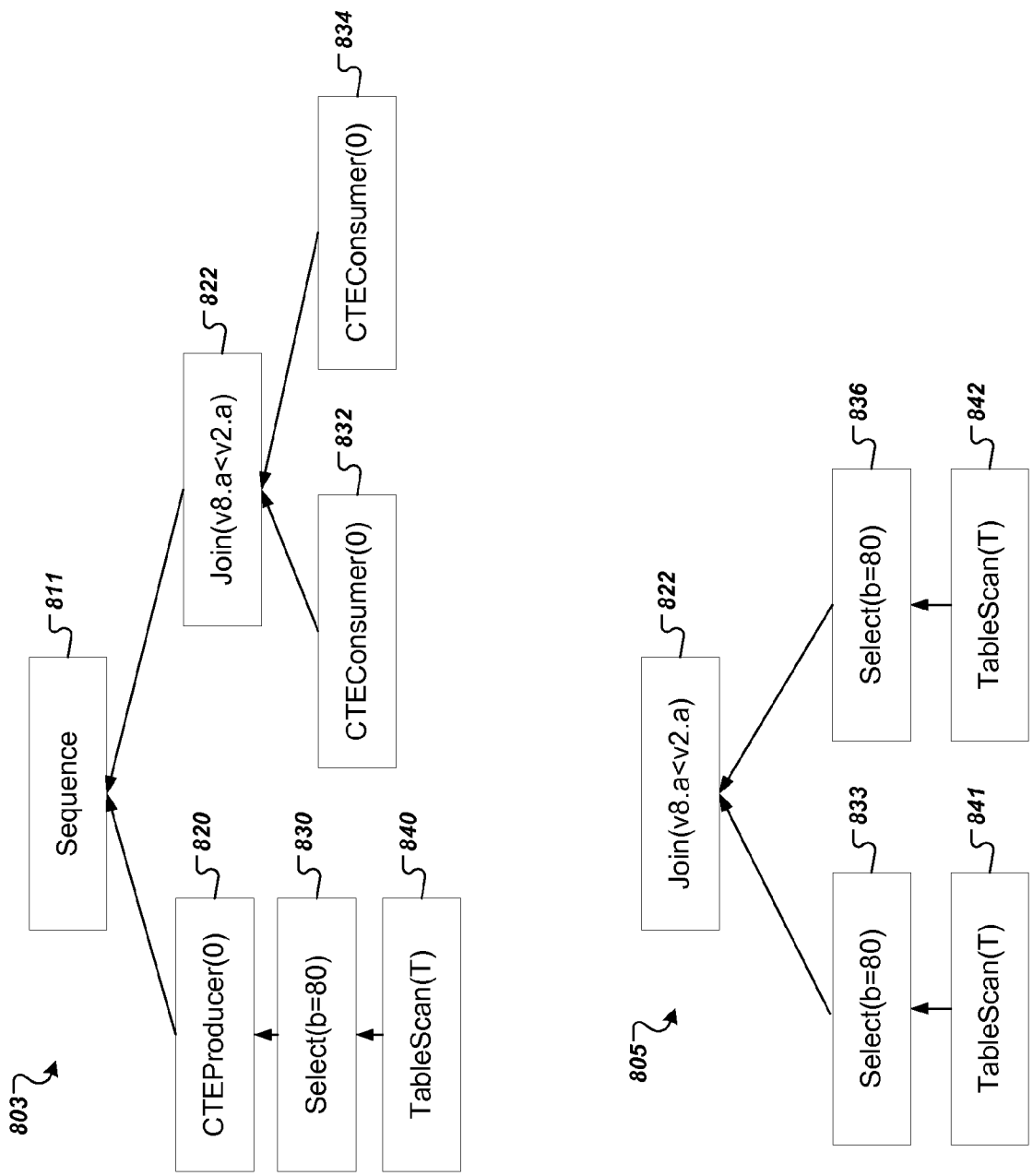
FIG. 8D illustrates a non inlined query plan and an inlined query plan.

FIG. 8D illustrates a non-inlined query plan 803 and an alternative inlined query plan 805. In general, the system can generate additional candidate query plans by selecting a particular operator from each group.

For example, the system can generate a first candidate query plan 803 by selecting the sequence operator 811 for the group 815. Selecting the sequence operator 811 also selects the children of the sequence operator 811 in the candidate query plan, which includes the CTE producer operator 820 and its children as well as the join operator 822. From the groups 835 and 845, the system can select the CTE consumer operators 832 and 834.

The system can generate a second, inlined candidate query plan 805 by selecting the no-op operator 812 for the group 815, which will include the join operator 822 and which will not include the CTE producer operator 820. The no-op operator 812 simply returns the result from its child. Thus, the no-op operator 812 essentially removes the CTE anchor operator 810 from the query plan. From the group 835, the system can select the select operator 833 and its child, and from the group 845, the system can select the select operator 836 and its child.

Figure 8E:
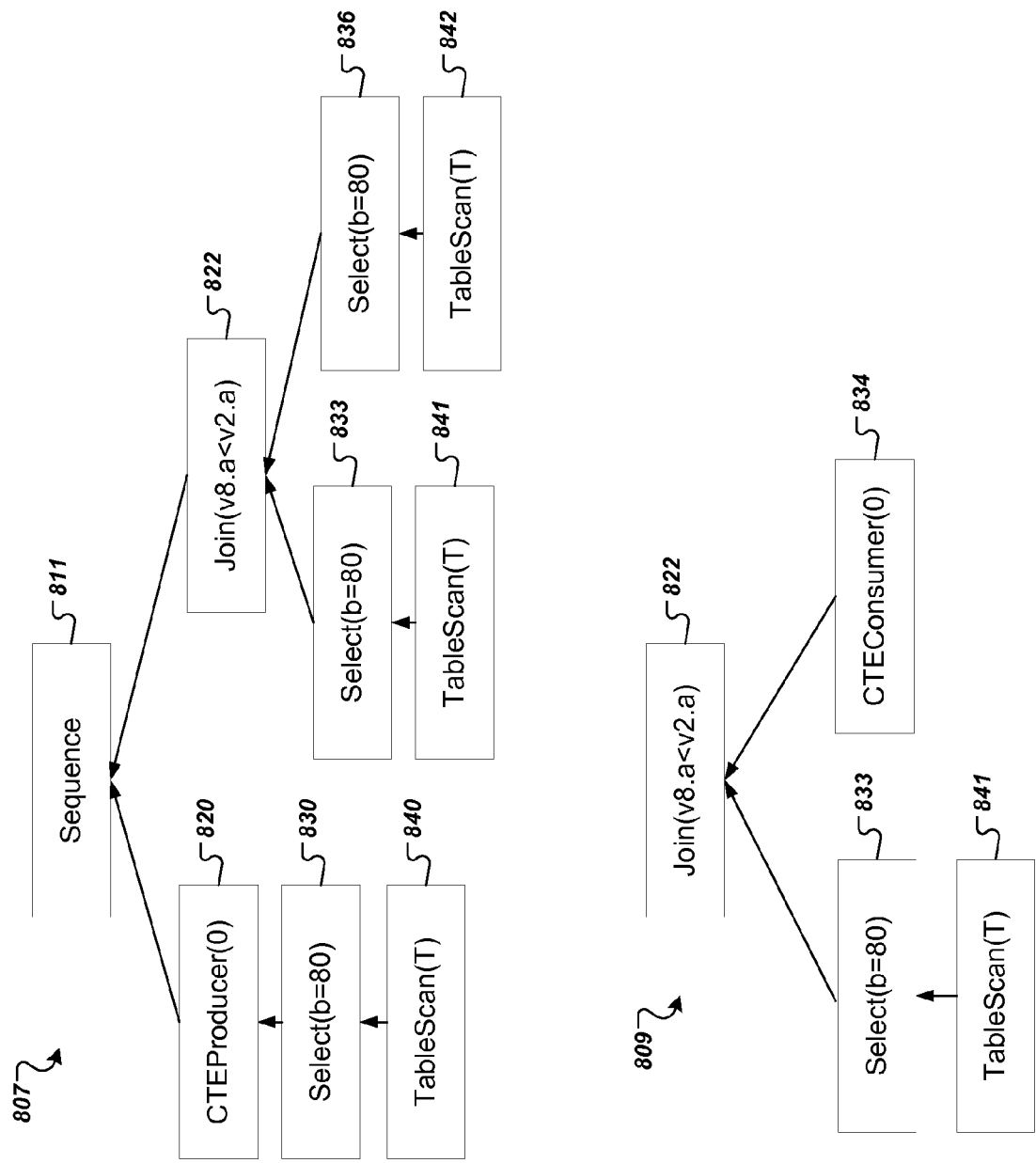
FIG. 8E illustrates invalid candidate query plans.

FIG. 8E illustrates invalid candidate query plans. Some candidate query plans generated by the system may be invalid because they include an unresolved CTE producer or consumer operator. In general, a CTE producer operator is unresolved when the query plan does not include a corresponding CTE consumer operator, and a CTE consumer operator is unresolved when the query plan does not include a corresponding CTE producer operator.

For example, the system can generate a first candidate query plan 807 by selecting the sequence operator 811 for the group 815. Selecting the sequence operator 811 also selects the children of the sequence operator 811 in the candidate query plan, which includes the CTE producer operator 820 and its children as well as the join operator 822. From the groups 835 and 845, the system can select the select operator 833 and the select operator 836, respectively. However, the first candidate query plan 807 is invalid because it includes an unresolved CTE producer operator 820 that does not have a corresponding CTE consumer operator.

The system can generate a second candidate query plan 809 by selecting the no-op operator 812 for the group 815, which will include the join operator 822 and which will not include the CTE producer operator 820. The no-op operator 812 simply returns the result from its child. Thus, the no-op operator 812 essentially removes the CTE anchor operator 810 from the query plan. From the group 835, the system can select the select operator 833 and its child, and from the group 845, the system can select the CTE consumer operator 834. However, the second candidate query plan 809 is invalid because it includes an unresolved CTE consumer operator 834 that does not have a corresponding CTE producer operator.

The system can discard invalid query plans from consideration or assign them a cost that is sufficiently high that they will not be selected. Determining which candidate query plans are invalid will be described in more detail below with reference to FIG. 9. As shown in FIG. 7, the system computes respective costs for the candidate query plans (730). The costs may differ based on the operations required for using CTE producers and CTE consumers versus using CTE inlining.

For example, the cost for a candidate query plan can include a cost associated with materializing the result computed by a CTE producer operator, e.g., a disk writing cost. The cost for a candidate query plan can also include a cost associated with CTE consumer operators reading the materialized result from a storage subsystem, e.g., disk reading costs. The cost for a candidate query plan can also include a cost associated with transferring data between computing nodes in the system.

On the other hand, the cost for a candidate query plan that inlines a CTE consumer can include the cost associated with recomputing the result of the CTE producer multiple times. However, the cost for a candidate query plan that inlines a CTE consumer can omit the cost associated with materializing the result and reading the materialized result. If all CTEs have been inlined, the cost for a candidate query plan will also omit the cost of using a sequence operator to define the CTE.

Additionally, the system can consider additional criteria when computing the cost for the alternative query plan. For example, a query planner can sometimes push down predicate expressions of SELECT statements to child operators so that the child operators apply the predicate expressions. Pushing down predicate expressions can reduce the size of intermediate data that is transferred among operators, which improve query execution time.

Computing the cost for computing the result of a complex CTEs may include a non-trivial amount of overhead. Thus, rather than recomputing the cost for each CTE consumer that has been inlined, the system can instead reuse the cost computed for the CTE producer, minus the cost of materializing the computed result. Thus, in some implementations the system only computes the cost of computing a result for the CTE once and reuses the cost for each inlined CTE consumer.

The system selects a query plan based on the respective costs (740). For example, the system can compare the cost associated with the non-inlined query plan 803 and the alternative inlined query plan 805 and select the query plan having the lowest cost.

The system may also select a particular query plan based on other criteria. For example, in some implementations, the system can always choose a query plan that inlines a CTE consumer if the CTE name is referenced only once in the query. The system can thus bypass operations for computing costs for either the initial or the alternative query plan and simply pick the alternative query plan that inlines the single CTE consumer operator in the initial query plan.

The system computes a result for the query using the selected query plan (750). The system can distribute the selected query plan to multiple computing nodes for execution and collect the final results at a master node of the system. The system may then provide the final computed result to a user of a user device.

Figure 9:
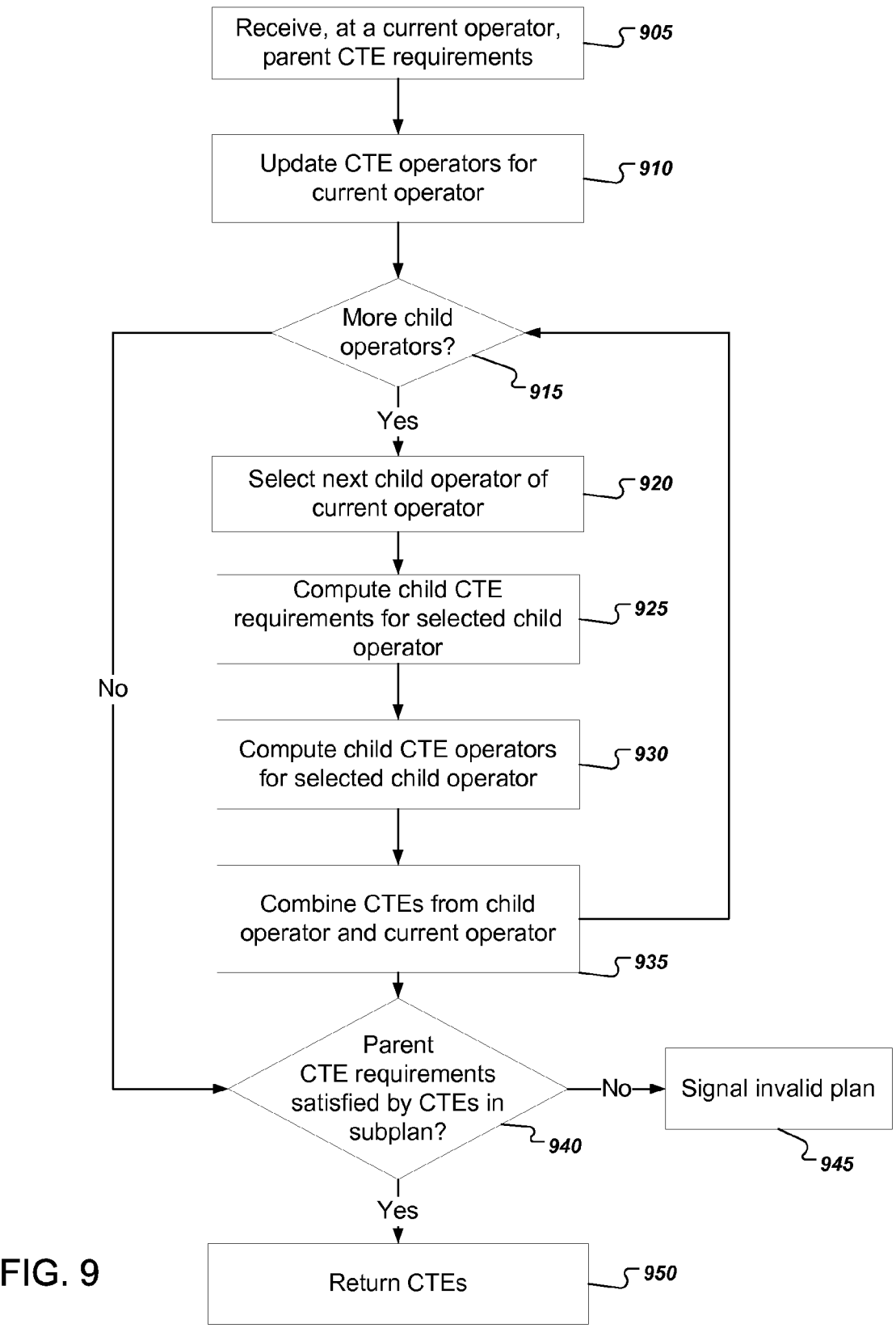
FIG. 9 is a flow chart of an example process for identifying invalid query plans.

FIG. 9 is a flow chart of an example process for identifying invalid query plans. A particular candidate query plan can be invalid for a number of reasons, including for having unresolved CTE operators. The system can perform the example process on a full or partial query plan. The system can recursively process operators in the query plan and update CTE operators that are included in the plan and CTE operators that have yet to be resolved. The process will be described as being performed by a system of one or more computers, e.g., the master node 212 of FIG. 2.

The system receives, at a current operator, parent CTE requirements (905). A parent CTE requirement is a specification of a CTE producer or consumer operator that needs to be resolved by the current operator or by a descendant operator of the current operator in order for the plan to be valid. In some implementations, the specification of a CTE producer or consumer operator includes an identifier and a CTE operator type. For example, the specification can be "(0, P)" for a producer of a CTE with an identifier of "0", or "(0, C)" for a consumer of a CTE with an identifier of "0". When the process starts at a root node in the full or partial query plan, the parent CTE requirements are an empty set.

The system updates CTE operators for the current operator (910). If the current operator is a CTE producer or consumer operator, the system updates a set of CTE operators for the current operator with a specification of the current operator. For all other operator types, the system does not alter the set of CTE operators for the current operator.

The system determines whether more child operators of the current operator remain (915). The system can consider each child operator of the current operator in order, recursively calling a function implementing the example process of FIG. 9. If more child operators remain, the system selects a next child operator of the current operator (branch to 920).

The system computes child CTE requirements for the selected child operator (925). The child CTE requirements for a selected child operator are a set of CTE specifications that each must be resolved by at least one descendant operator for the plan to be valid.

To compute the child CTE requirements, the system compares the set of CTE operators for the current operator with the set of parent CTE requirements. The system can update the child CTE requirements for a child operator under two conditions.

Under a first condition, if a previous child added a CTE operator specification to the set of CTE operators for the current operator, and if the added CTE operator specification did not occur in the set of parent CTE requirements, the system can update the child CTE requirements to include the converse of the CTE operator added by the previous child.

For example, in the query plan 807 of FIG. 8D, the CTE producer operator 820 returns to the sequence operator 811 a CTE specification "(0,P)" that was not introduced by a parent of the sequence operator 811. Therefore, the requirement for the join operator 822 will include the converse of "(0,P)", which is "(0,C)". In other words, because the first child of the sequence operator 811 included a CTE producer operator, the second child of the sequence operator 811 or one of its descendants must include a corresponding CTE consumer operator in order for the plan to be valid.

Under a second condition, if an operator is a last child operator to be considered and if a parent CTE requirement was not resolved by any previous children of the current operator, the system updates the child CTE requirements to include the parent CTE requirement. In other words, if a parent CTE requirement has not be resolved by any children, and only one child operator remains to be considered, the system can require the last child operator to resolve the parent CTE requirement.

For example, in the query plan 807 of FIG. 8E, the join operator 822 will receive the parent CTE requirement "(0, C)" from sequence operator 811. This CTE consumer operator will not be resolved by the first child of the join operator 822, so the system will update the child CTE requirements for the second child of the join operator 822 to include "(0,C)." The system can thus indicate that the query plan will be invalid if no operators in the subtree of the second child resolve the parent CTE requirement.

The system computes the CTE operators for the selected child operator (930). The system passes the computed child CTE requirements to the selected child operator. The child operator will then treat the passed child CTE requirements as parent CTE requirements, for example, as described above with reference to step 905.

The system can implement this functionality recursively by calling a function implementing the example process to operate on the selected child operator. The selected child operator can also recursively call the function for each of its child operators and will eventually return a set of child CTE operators.

The system combines CTEs from the selected child operator and the current operator (935). In general, the system merges the two sets of CTE operator specifications and eliminates any pairs of corresponding CTE producers and consumers. For example, if the merged set includes both "(0,P)" and "(0,C)," the system can remove both CTE specifications from the set of CTE specifications for the current operator. In some implementations, the system does not duplicate CTE specifications in the merged set.

The system determines whether all parent CTE requirements are satisfied by CTE operators for the current operator (940). The system can determine whether the CTE operators for the current operator satisfy the parent CTE requirements by determining whether each parent CTE requirement has a corresponding operator in the set of CTE operators for the current operator. In other words, the system determines whether all required CTE operators received from the parent were resolved by CTE operators in the subplan of the current operator.

If not, the system signals an invalid query plan (branch to 945). Because at least one parent CTE requirement was not resolved by the operators in the subplan of the current operator, the query plan will likely introduce deadlocks or incorrect results if the system attempted to execute the query plan. Notably, the system need not continue processing the query plan recursively up and including the root node of the query plan. Instead, the system can proceed directly to signaling an invalid query plan.

For invalid query plans, the system can stop processing the plan and remove the query plan from consideration as a candidate query plan for the query. In some implementations, the system can bypass computing costs for query plans that the system has determined to be invalid.

Figure 10:
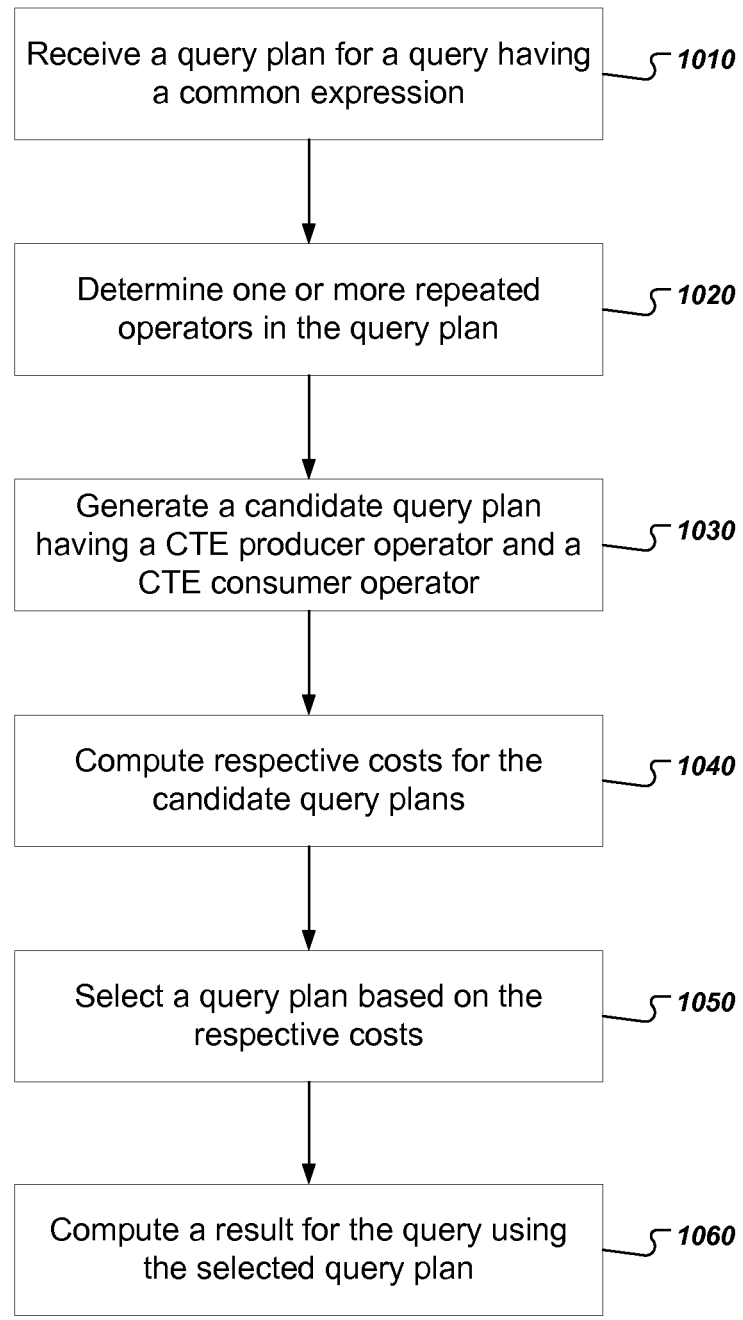
FIG. 10 is a flow chart of an example process for eliminating common expressions in a query.

If all parent CTE requirements are satisfied by CTE operators for the current operator (940), the system returns the set of CTE operators for the current operator (branch to 950). FIG. 10 is a flow chart of an example process for eliminating common expressions in a query. A common expression in a query is an expression in a query that is evaluated multiple times in a query plan for the query, but that is not explicitly defined in the query as a CTE. A system can identify common expressions in a query and generate a query plan that includes CTE producer and consumer operators to avoid repeated evaluation of the common expression. The process will be described as being performed by a system of one or more computers, e.g., the master node 212 of FIG. 2.

The system receives a query plan for a query having a common expression (1010). Table 5 includes an example of a query that includes a common expression.

TABLE 5

```
SELECT *
FROM (SELECT a, count(*) as b
    FROM T GROUP BY a
    HAVING count(*) > 10) t1,
    (SELECT a, count(*) as b
    FROM T GROUP BY a
    HAVING count(*) > 20) t1
WHERE t1.a < t2.a
```

Figure 11A:
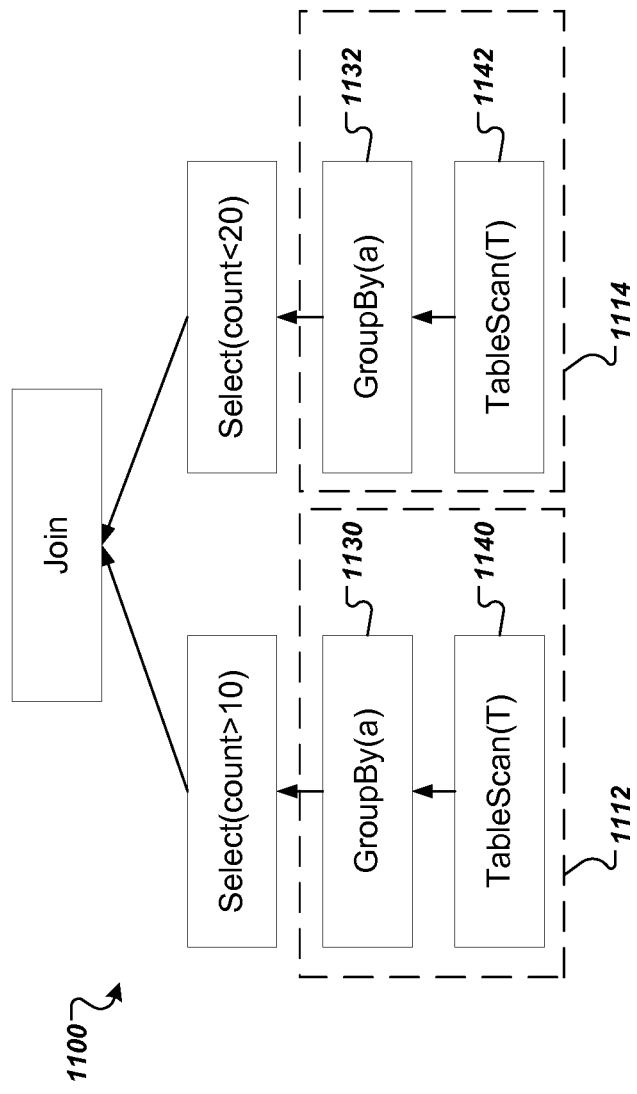
FIG. 11A illustrates a candidate query plan for the query in Table 5.

FIG. 11A illustrates a candidate query plan 1100 for the query in Table 5. The query plan 1100 includes two subplans 1112 and 1114 that have identical operators. In other words, the group by operator 1130 is identical to the group by operator 1132, and the table scan operator 1140 is identical to the table scan operator 1142.

As shown in FIG. 10, the system determines one or more repeated operators in the query plan (1020). Because the system will replace instances of repeated operators with CTE consumer operators, the system can identify common patterns of operators that include leaf-level operators.

For example, the system can consider subtrees that include leaf-level operators up to a particular subtree depth. The system can iteratively consider subtrees of increasing depth until no more matching subtrees are found. In some implementations, the system does not define a new CTE unless a subtree of a minimum depth is matched, e.g., at least 2, 3, or 5 operators deep.

The system generates a candidate query plan having a CTE producer operator and a CTE consumer operator (1030). The system can avoid repeating the computations of the repeated operators in the query plan by generating an alternative query plan that defines a CTE producer operator and one or more corresponding CTE consumer operators.

Figure 11B:
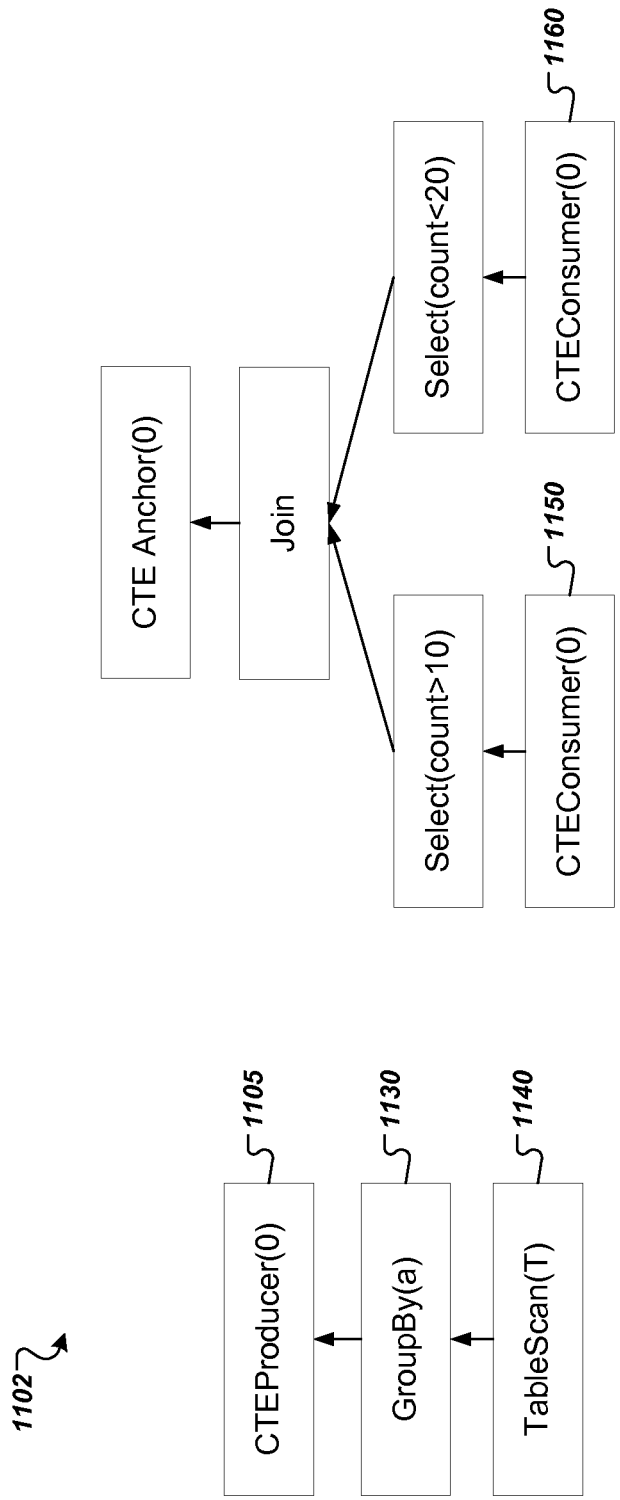
FIG. 11B illustrates a candidate query plan for the query in Table 5 with CTE producer and consumer operators.

FIG. 11B illustrates a candidate query plan 1102 for the query in Table 5 with CTE producer and consumer operators. The query plan 1102 includes a CTE producer operator 1105 whose descendant operators 1130 and 1140 compute a result for the common expression. The CTE producer operator 1105 then materializes the result for consumption by the CTE consumer operators 1150 and 1160.

The system can generate further candidate query plans by expanding the candidate query plan 1102. For example, the system can inline one or more of the CTE consumer operators, e.g., as described above with reference to FIG. 7.

As shown in FIG. 10, the system computes respective costs for the candidate query plans (1040). The system can eliminate invalid query plans, e.g., as described above with reference to FIG. 9, and compute costs for each of the candidate query plans as described above with reference to FIG. 7. The system can also consider the original query plan as a candidate. For simple common expressions, the cost of defining the CTE producer operator may not result in better performance. In some cases, inlining all of the CTE consumer operators will result in the system regenerating the original query plan. In these cases, the system can eliminate duplicate query plans from consideration. The system selects a query plan based on the respective costs (1050). The system can select a query planning having the lowest overall cost for execution.

The system computes a result for the query using the selected query plan (1060). After selecting the query plan, the system can distribute the query plan to one or more computing nodes for computing a result for the query.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," "software engine," or "software module" refers to a software implemented input/output system that provides an output that is different from the input. An engine or module can be an encoded block of functionality, such as a library, a platform, a software development kit ("SDK"), or an object. Each engine or module can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines or modules may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
receiving an initial query plan generated for a query that includes a common expression that occurs multiple times in the query;
identifying two or more matching subtrees of the initial query plan that each include operators for computing results for the common expression;
generating an alternative query plan that includes a common table expression producer operator and having an instance of one of the matching subtrees as one or more descendant operators of the common table expression producer operator wherein the common table expression producer operator receives a result computed by the descendent operators and stores the result, the generating including replacing at least one instance of an identified matching subtree in the initial query plan with a common table expression consumer operator corresponding to the common table expression producer operator, wherein the common table expression consumer operator retrieves the stored result;
computing respective costs for the initial query plan and the alternative query plan;
selecting the alternative query plan based on the cost for the alternative query plan; and
computing a result for the query using the alternative query plan instead of the initial query plan.

2. The method of claim 1, wherein each matching subtree includes a leaf-level operator of the initial query plan.

3. The method of claim 1, wherein identifying one or more matching subtrees of the initial query plan comprises identifying matching subtrees of increasing depth until no subtrees in the initial query plan match.

4. The method of claim 3, wherein generating the alternative query plan comprises inlining an instance of the common table expression consumer operator.

5. The method of claim 1, wherein the cost for the alternative query plan includes a cost associated with materializing the result of the common table expression producer operator and a cost associated with the common table expression consumer operator reading the materialized result from a storage subsystem.

6. The method of claim 1, wherein the cost for the alternative query plan includes a cost associated with transferring data between computing nodes in a system that would execute the alternative query plan.

7. The method of claim 1, wherein the cost for the initial query plan includes a cost of recomputing a result for the common expression.

8. A system comprising:
one or more computers and one or more storage devices storing instructions that are operable, when executed by the one or more computers, to cause the one or more computers to perform operations comprising:
receiving an initial query plan generated for a query that includes a common expression that occurs multiple times in the query;
identifying two or more matching subtrees of the initial query plan that each include operators for computing results for the common expression;
generating an alternative query plan that includes a common table expression producer operator and having an instance of one of the matching subtrees as one or more descendant operators of the common table expression producer operator wherein the common table expression producer operator receives a result computed by the descendent operators and stores the result, the generating including replacing at least one instance of an identified matching subtree in the initial query plan with a common table expression consumer operator corresponding to the common table expression producer operator, wherein the common table expression consumer operator retrieves the stored result;
computing respective costs for the initial query plan and the alternative query plan;
selecting the alternative query plan based on the cost for the alternative query plan; and
computing a result for the query using the alternative query plan instead of the initial query plan.

9. The system of claim 8, wherein each matching subtree includes a leaf-level operator of the initial query plan.

10. The system of claim 8, wherein identifying one or more matching subtrees of the initial query plan comprises identifying matching subtrees of increasing depth until no subtrees in the initial query plan match.

11. The system of claim 10, wherein generating the alternative query plan comprises inlining an instance of the common table expression consumer operator.

12. The system of claim 8, wherein the cost for the alternative query plan includes a cost associated with materializing the result of the common table expression producer operator and a cost associated with the common table expression consumer operator reading the materialized result from a storage subsystem.

13. The system of claim 8, wherein the cost for the alternative query plan includes a cost associated with transferring data between computing nodes in the system.

14. The system of claim 8, wherein the cost for the initial query plan includes a cost of recomputing a result for the common expression.

15. A computer program product, encoded on one or more non-transitory computer storage media, comprising instructions that when executed by one or more computers cause the one or more computers to perform operations comprising:
  receiving an initial query plan generated for a query that includes a common expression that occurs multiple times in the query;
  identifying two or more matching subtrees of the initial query plan that each include operators for computing results for the common expression;
  generating an alternative query plan that includes a common table expression producer operator and having an instance of one of the matching subtrees as one or more descendant operators of the common table expression producer operator wherein the common table expression producer operator receives a result computed by the descendent operators and stores the result, the generating including replacing at least one instance of an identified matching a matching subtree in the initial query plan with a common table expression consumer operator corresponding to the common table expression producer operator, wherein the common table expression consumer operator retrieves the stored result;
  computing respective costs for the initial query plan and the alternative query plan;
  selecting the alternative query plan based on the cost for the alternative query plan; and
  computing a result for the query using the alternative query plan instead of the initial query plan.

16. The computer program product of claim 15, wherein each matching subtree includes a leaf-level operator of the initial query plan.

17. The computer program product of claim 15, wherein identifying one or more matching subtrees of the initial query plan comprises identifying matching subtrees of increasing depth until no subtrees in the initial query plan match.

18. The computer program product of claim 17, wherein generating the alternative query plan comprises inlining an instance of the common table expression consumer operator.

19. The computer program product of claim 15, wherein the cost for the alternative query plan includes a cost associated with materializing the result of the common table expression producer operator and a cost associated with the common table expression consumer operator reading the materialized result from a storage subsystem.

20. The computer program product of claim 15, wherein the cost for the alternative query plan includes a cost associated with transferring data between computing nodes in a system that would execute the alternative query plan.

21. The computer program product of claim 15, wherein the cost for the initial query plan includes a cost of recomputing a result for the common expression.

* * * * *

UNITED STATES PATENT AND TRADEMARK OFFICE
CERTIFICATE OF CORRECTION

| | |
|---|---|
| PATENT NO. | : 9,501,536 B1 |
| APPLICATION NO. | : 14/336981 |
| DATED | : November 22, 2016 |
| INVENTOR(S) | : Amr El-Helw et al. |

It is certified that error appears in the above-identified patent and that said Letters Patent is hereby corrected as shown below:

In the Claims

Column 21, Line 35, in Claim 15, after "matching" delete "a matching".

Signed and Sealed this
Seventh Day of February, 2017

Michelle K. Lee
*Director of the United States Patent and Trademark Office*